(12) United States Patent
Harvey

(10) Patent No.: US 9,511,814 B2
(45) Date of Patent: ***Dec. 6, 2016

(54) HANDGRIP

(71) Applicant: Jonathan Neil Harvey, Bluffdale, UT (US)

(72) Inventor: Jonathan Neil Harvey, Bluffdale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,354

(22) Filed: Nov. 5, 2015

(65) Prior Publication Data

US 2016/0046348 A1 Feb. 18, 2016

Related U.S. Application Data

(63) Continuation of application No. 14/257,805, filed on Apr. 21, 2014, now Pat. No. 9,180,588.

(60) Provisional application No. 61/814,308, filed on Apr. 21, 2013.

(51) Int. Cl.
  *B62K 21/26* (2006.01)
  *B25G 1/01* (2006.01)
  *B25G 1/10* (2006.01)

(52) U.S. Cl.
  CPC .............. *B62K 21/26* (2013.01); *B25G 1/01* (2013.01); *B25G 1/102* (2013.01); *Y10T 16/466* (2015.01)

(58) Field of Classification Search
  CPC .. Y10T 16/466; Y10T 16/4713; Y10T 16/476; Y10T 16/469; Y10S 16/12; B25G 1/102; B25G 1/10; B25G 1/02; B25G 1/01; B62K 21/26
  USPC .. 16/421, 430, 426, 422, DIG. 12; 74/551.9; D8/303
  See application file for complete search history.

(56) References Cited

U.S. PATENT DOCUMENTS

| 452,577 A | 5/1891 | Latta |
| 581,260 A | 4/1897 | Biddie |
| 587,626 A | 8/1897 | Vollmer |
| 599,564 A | 2/1898 | Kinter |
| 3,937,629 A | 2/1976 | Hamasaka |
| 4,004,818 A | 1/1977 | Ramillon |

(Continued)

FOREIGN PATENT DOCUMENTS

| DE | 202009004874 U1 | 12/2009 |
| EP | 1354793 A3 | 3/2003 |

OTHER PUBLICATIONS

International Search Report and Written Opinion for PCT/US2014/034838, Aug. 29, 2014, pp. 1-40.

*Primary Examiner* — William Miller
(74) *Attorney, Agent, or Firm* — Maschoff Brennan

(57) ABSTRACT

A handgrip device configured to be removably coupled to a bicycle handlebar. The handgrip device may include a first portion that includes an opening with a center axis. The opening may be configured to receive a portion of a handle that includes a center rotational axis such that the center rotational axis is substantially aligned with the center axis of the first portion. The handgrip device may also include a second portion that is coupled to and fixed with respect to the first portion. The second portion may include a proximal end that is coupled to the first portion and a distal end that may extend away from the proximal end. The second portion may also include a first concaved side coupled between the proximal and distal ends. The first concaved side may face a first direction that is substantially perpendicular to the center axis of the first portion.

20 Claims, 10 Drawing Sheets

(56) References Cited

U.S. PATENT DOCUMENTS

| | | | |
|---|---|---|---|
| 4,641,857 A | 2/1987 | Gailiunas | |
| D305,401 S | 1/1990 | Winston | |
| 5,235,871 A | 8/1993 | Yamazaki | |
| 5,425,285 A | 6/1995 | Cheng | |
| 5,429,013 A | 7/1995 | Taylor | |
| 5,758,548 A | 6/1998 | Smith | |
| D411,497 S | 6/1999 | Lagaay | |
| D412,824 S | 8/1999 | Hoefle et al. | |
| 5,983,747 A | 11/1999 | Chen | |
| 6,263,759 B1 | 7/2001 | Hollingsworth et al. | |
| 6,305,052 B1 | 10/2001 | Sinclair | |
| D465,719 S | 11/2002 | Ditzig et al. | |
| 6,658,965 B2 | 12/2003 | Allen | |
| 6,964,214 B2 | 11/2005 | Wu | |
| D606,467 S | 12/2009 | Ballard et al. | |
| 8,359,713 B1 | 1/2013 | Chen | |
| D738,184 S * | 9/2015 | Harvey | D8/303 |
| D743,324 S * | 11/2015 | Deng | D12/400 |
| 2004/0064868 A1 | 4/2004 | Williams et al. | |
| 2007/0062006 A1 | 3/2007 | Wright | |
| 2009/0223320 A1 | 9/2009 | Chen et al. | |
| 2010/0263168 A1 | 10/2010 | Hsieh | |
| 2010/0275415 A1 | 11/2010 | Gonzales et al. | |
| 2012/0137821 A1 | 6/2012 | Badollet | |
| 2014/0194800 A1 | 7/2014 | Green | |

\* cited by examiner

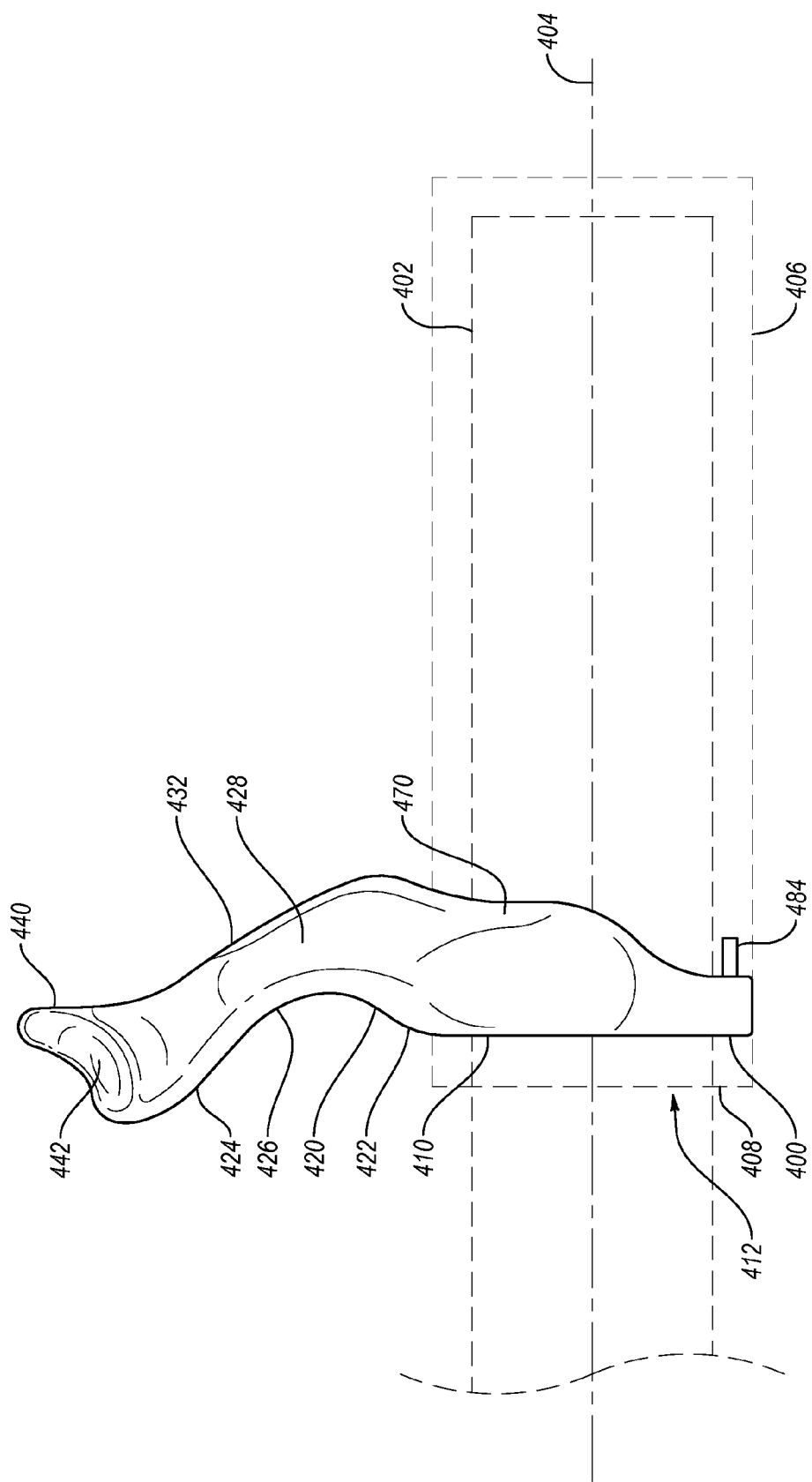

HANDGRIP

CROSS-REFERENCE TO RELATED APPLICATIONS

This application is a continuation of and claims the benefit of priority of U.S. application Ser. No. 14/257,805, filed on Apr. 21, 2014, issued as U.S. Pat. No. 9,180,588 on Nov. 11, 2015, which claims the priority of U.S. Provisional Application No. 61/814,308, filed on Apr. 21, 2013, the entire contents of which are incorporated herein by reference.

FIELD

The embodiments discussed herein are related to handgrip devices.

BACKGROUND

Numerous types of bar handgrips have been designed to make gripping a bar more comfortable, to minimize the slippage of the hand on the bar, and/or to increase the ability of a user to hold onto a bar.

For example, padded type handgrips have been developed, generally of open cellular foam material that is placed on a bar to provide some cushioning. One of the problems with such open cellular cushioning material is that the material readily compresses and merely serves as a slight cushioning material that enables a user to more securely grip the bar. In some circumstances, such as when the handgrip is on a bicycle, a handlebar of the bicycle may directly transfer vibration from the bicycle to a biker's hand. As a result, hands of bikers may become quite fatigued from the vibration that is transmitted from the handlebar to the hands.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a handgrip device configured to be removably coupled to a handle may include a first portion and a second portion. The first portion may include an opening with a center axis. The opening may be configured to receive a portion of a handle that includes a center rotational axis such that the center rotational axis is substantially aligned with the center axis of the first portion. The second portion may be coupled to and fixed with respect to the first portion. The second portion may include a proximal end that is coupled to the first portion and a distal end that extends away from the proximal end. As a result, the distal end may be positioned further from the center axis of the opening of the first portion than the proximal end. The second portion may also include a first concaved side coupled between the proximal and distal ends. The first concaved side may face a first direction substantially perpendicular to the center axis of the first portion.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4B is another side view of the example handgrip of FIG. 4A.

DETAILED DESCRIPTION

Some embodiments herein describe an example handgrip that may be used for a handle. The handgrip may be removably attached to a handle or formed integrally with the handle.

A handgrip as disclosed herein may include a first portion, a second portion, and a third portion. In some embodiments, such as when the handgrip is removably attachable to a handle, the first portion may have an opening to receive a handle. The first portion may also include a fastener to couple the first portion to the handle or to an attachment that is coupled to the handle. The second portion may couple to the first portion and may extend away from the handle. In some embodiments, the second portion may be configured to be grasped by a hand of a user of the handgrip. The third portion may be coupled to the second portion. In some embodiments, the third portion may be slightly larger than the second portion. In these and other embodiments, the third portion may assist in maintaining a hand, which is grasping the handgrip, in contact with the handgrip.

An example handgrip as described herein may be used for any type of handle. For example, the handgrip may be used on shopping carts, kayak paddles, shovels, or other devices that include a handle. In some embodiments, the handgrip may be used with handles for transportation devices, such as bicycles, motorcycles, all-terrain vehicles, watercraft, among other devices; engine-powered equipment, such as lawn mowers and other lawn care equipment, snow blowers, among other types of equipment.

A handgrip as described herein may provide support for fingers, thumbs, hands, and wrists, for some individuals, in an anatomically neutral fashion. In some embodiments, anatomically neutral may refer to the positions of a person's fingers when the person is standing and the arms of the person hang in a natural and relaxed position. A handgrip, as described herein, in some embodiments, may promote an anatomically neutral hand position of a user of the handgrip by supporting the fingers, thumbs, hands, and wrists in a position similar to a relaxed or resting hand position.

Alternately or additionally, a handgrip as described herein may remove pressure points on a hand of a user as compared to a user gripping a handle without the handgrip by distributing the user's forward and downward body weight into the handle. In some embodiments, a handgrip as described herein may result in a user using less energy to grip a handle than if the handgrip is not used. As a result of allowing a user to use less energy to grip a handle, the handgrip may promote lower blood pressure, stress, fatigue, and vibration in the fingers, wrists, forearms, and shoulders of the user when the user uses the handgrip to grip a handle.

Figure 1:
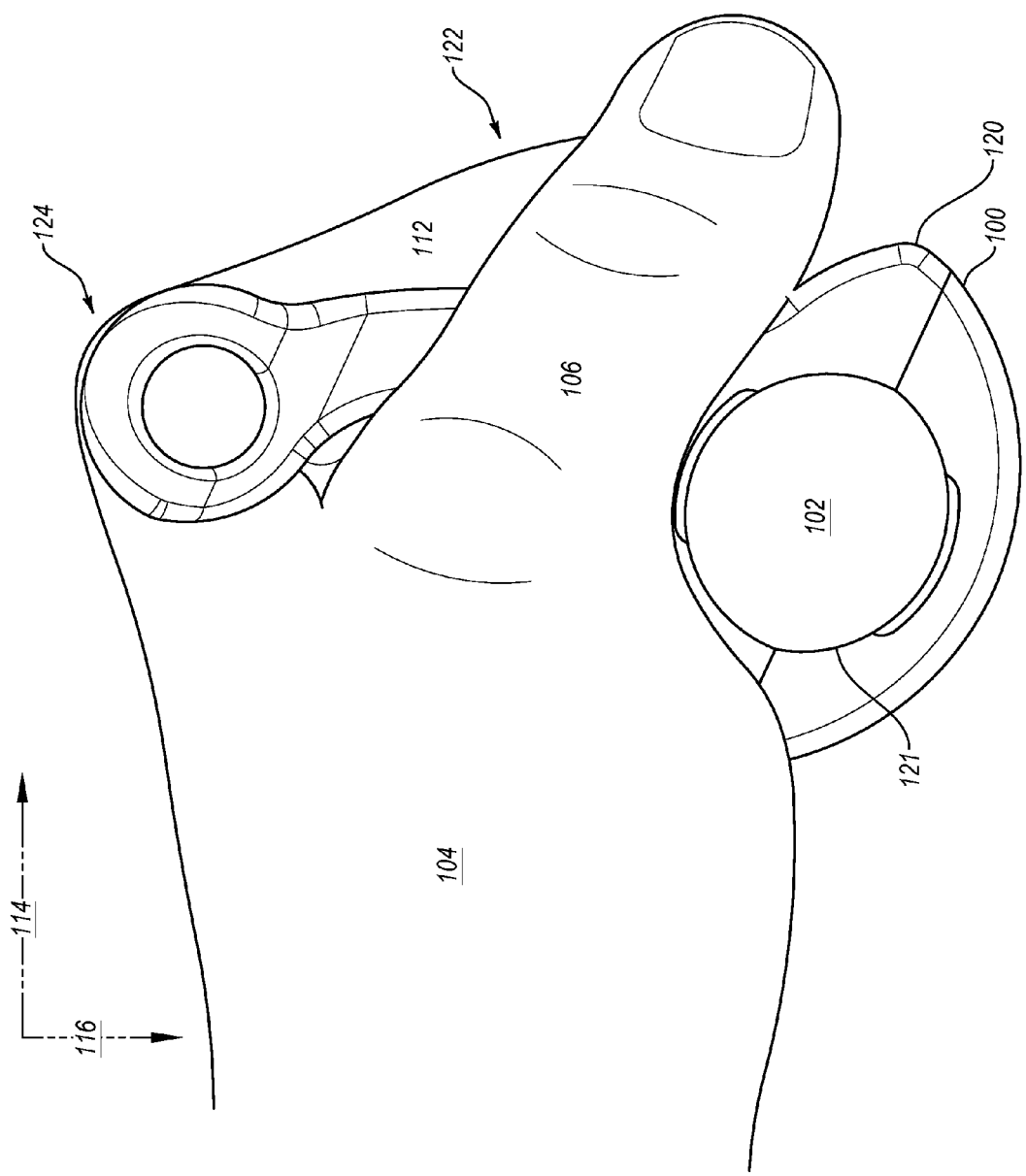
FIG. 1 is a side view of an example handgrip in use.

FIG. 1 is a side view of an example handgrip 100 in use, arranged in accordance with at least one embodiment described herein. The handgrip 100 as illustrated includes a first portion 120, a second portion 122, and a third portion 124. The first portion 120 includes an opening 121. The opening 121 may be sized to receive a handle 102. The handle 102 may be a handle for any number of devices, including a bicycle, lawn mower, shovel, or any other device. The first portion 120 may include a fastener to couple the handgrip 100 to the handle 102. In particular, the first portion 120 may be coupled to the handle 102, such that the handgrip 100 is rigidly coupled to the handle 102. As a result, movement or pressure applied to the handgrip 100 may readily be applied to the handle 102 to direct the handle 102 or otherwise manipulate the handle 102. In these and other embodiments, some minor movement of the handgrip 100 with respect to the handle 102 may be acceptable depending on the use of the handle 102.

The second portion 122 may be rigidly coupled to the first portion 120 such that the second portion 122 is fixed with respect to the first portion 120. The second portion 122 may be configured to be gripped by a hand 104 of a user. For example, as illustrated in FIG. 1, the second portion 122 may be positioned between a thumb 106 and an index finger 112 of the hand 104 of a user.

The third portion 124 may be rigidly coupled to the second portion 122 such that the third portion 124 is fixed with respect to the second portion 122. The third portion 124 may have a length and/or a width that is larger than a length and/or width of the second portion 122. As a result, the third portion 124 may encourage the hand to maintain in contact with the second portion 122 while allowing the hand 104 to easily disengage with the second portion 122.

In other handles, the thumb 106 is typically wrapped around an opposite side of the handle 102 than the index finger 112 to more easily allow a downward force 116 or a forward force 114 to be applied to the handle 102 by the hand 104. As illustrated, using the handle 102, the thumb 106 may be positioned on a same side of the handle 102 as the index finger 112 and the hand 104 may still apply the downward force 116 or the forward force 114 to the handle 102. As a result, the hand 104 may control or manipulate a direction of the handle 102 without having the thumb 106 positioned on an opposite side of the handle 102 from the index finger 112. The position with the thumb 106 over the bar may be referred to herein as a thumb-over-the-bar position.

The handgrip 100 does not, however, prevent the hand 104 from gripping the handle 102 with a "fist-grip" position where the thumb 106 is positioned under the handle 102. As a result, the handgrip 100 may assist in providing a user with an ability to alternate between a "neutral" position as illustrated in FIG. 1, and the fist-grip position. An ability to alternate between gripping positions may reduce fatigue in the hand 104 or an arm coupled to the hand 104. Furthermore, using the neutral position as illustrated in FIG. 1 may reduce energy used by the hand 104 to grip and/or manipulate the handle 102.

Modifications, additions, or omissions may be made to the handgrip 100 without departing from the scope of the present disclosure.

Figure 2:
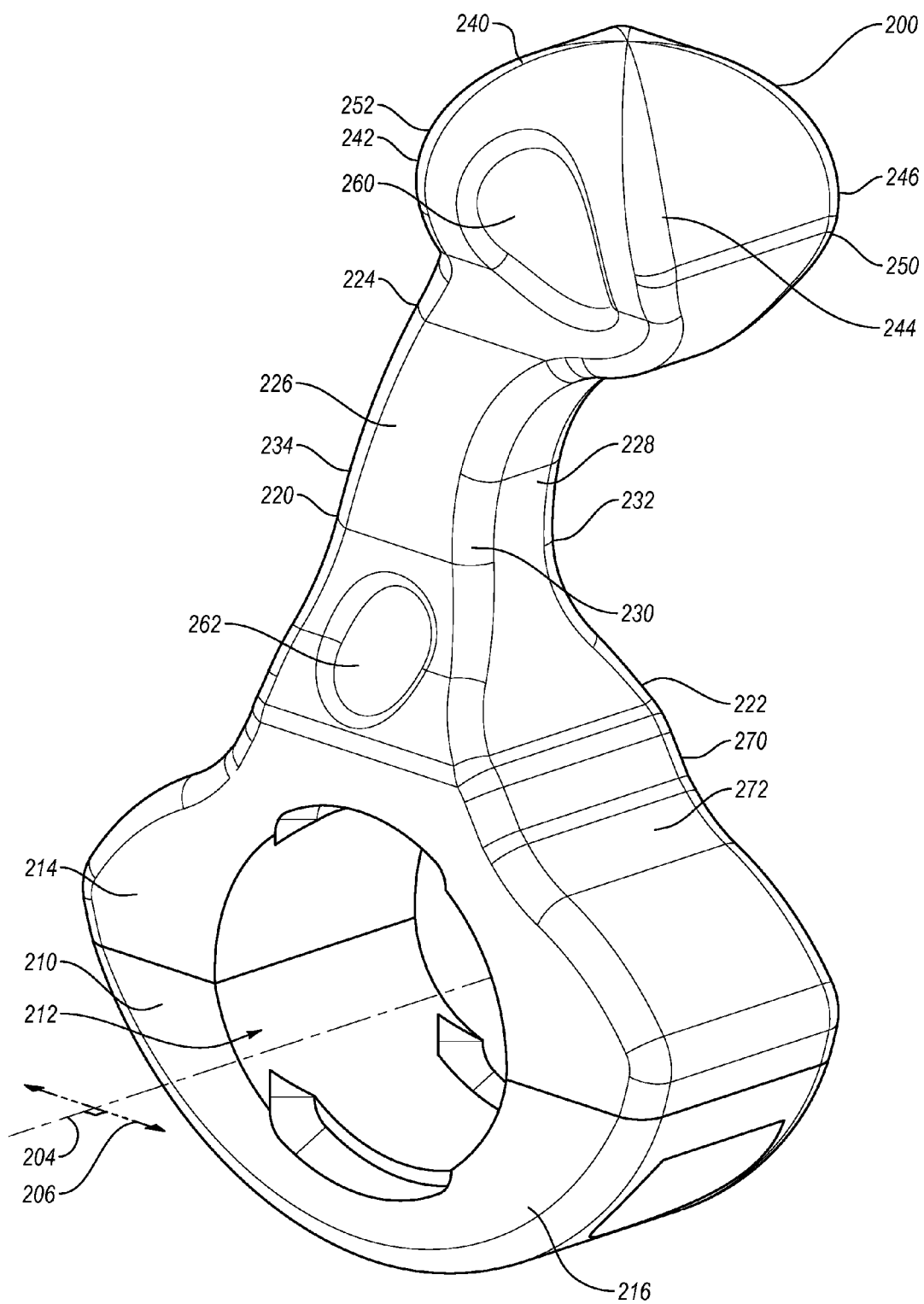
FIG. 2 is a perspective view of another example handgrip.

FIG. 2 is a perspective view of another example handgrip 200, arranged in accordance with at least one embodiment described herein. The handgrip 200 may be formed of a rigid material such as a composite (e.g., carbon fiber), a metal (e.g., aluminum, steel, titanium, alloy, etc.), a polymer, some combination thereof, or some other material or combination of materials. The handgrip 200 may be machined from a solid block of the rigid material, molded (e.g., injection molded, cast, etc.) from a rigid material, or otherwise constructed.

The handgrip 200 may include a first portion 210, a second portion 220, a third portion 240, and a fourth portion 270. The first portion 210 may include an opening 212 that may be sized to receive a handle. The opening 212 may include a center axis 204 that passes therethrough. The opening 212 is depicted as a circular opening, but the opening 212 may be different shapes, for example, square, oval, rectangular, hexagonal, octagonal, or some other shape. In some embodiments, the shape of the opening 212 may correspond to the shape of the handle to which the handgrip 200 may be removably attached.

The first portion 210 may include a lower portion 216 and an upper portion 214. The lower portion 216 may be removably coupled to the upper portion 214, using a as a fastener, such as a screw. To couple the handgrip 200 to a handle, the lower portion 216 may be removed and the upper portion 214 may be placed on the handle. The lower portion 216 may be aligned with the upper portion 214 and coupled to the upper portion 214 such that the handle is received in the opening 212. As a result, the handgrip 200 may be coupled to the handle. The handgrip 200 may be coupled to the handle such that a force applied to the handgrip 200 is transferred to the handle. In some embodiments, the handgrip 200 may be rigidly coupled to the handle such that minimal play is allowed between the handgrip 200 and the handle.

The second portion 220 may be rigidly coupled to the first portion 210 such that the second portion 220 is fixed with respect to the first portion 210. The second portion 220 may include a proximal end 222 and a distal end 224. The proximal end 222 may be coupled to the first portion 210. The distal end 224 may be coupled to the third portion 240. The distal end 224 may extend away from the proximal end 222 such that the distal end 224 is positioned further from the center axis 204 of the opening 212 of the first portion 210 than the proximal end 222.

In some embodiments, the proximal end 222 may be positioned directly over the opening 212 of the first portion 210. In these and other embodiments, the proximal end 222 may be positioned directly over a handle positioned in the opening 212. In these and other embodiments, for example, when the handle is a handlebar of a bicycle, the proximal end 222 may be positioned to be opposite a side of the bicycle handlebar that is parallel to and nearest to the ground when the bicycle is being ridden on flat ground. In some embodiments, the proximal end 222 may be offset from the opening 212 in a direction 206 that is substantially perpendicular to the center axis 204.

The second portion 220 may further include a first side 226 and a second side 228 that extend between the proximal end 222 and the distal end 224. The first side 226 may extend between edges 230 and 234. A distance between the edges 230 and 234 may be a length of the second portion 220. The first side 226 may be facing a first direction that is substantially parallel to the center axis 204. In some embodiments, the first direction being substantially parallel to the center axis 204 may indicate that the first direction is within 0, 5, 10, or 20 degrees of being parallel with the center axis 204.

The second side 228 may extend between the edges 230 and 232. A distance between the edges 230 and 232 may be a width of the second portion 220. The second side 228 may be facing a second direction that is substantially perpendicular to the first direction. In some embodiments, substantially perpendicular may indicate that the second direction is within 0, 5, 10, or 20 degrees of being perpendicular with the first direction. As illustrated, the length of the second portion 220 may be larger than the width of the second portion 220. In some embodiments, the length of the second portion 220 may be twice or more than twice the width of the second portion 220. The second portion 220 having the length longer than the width may provide for better user control of a handle coupled to the handgrip 200 and comfort for a user. For example, the longer length may provide for more material of the handgrip 200 to contact a hand of a user to change an orientation of the handle coupled to the handgrip 200. The shorter width may provide for more comfort as the second portion 220 may rest between a thumb and an index finger of the hand of the user. Alternately or additionally, the length and the width of the second portion 220 may be similar or equal.

As illustrated, the second portion 220 may taper as the second portion 220 extends from the proximal end 222 for a first part of the second portion 220. After tapering, the second portion 220 may then expand for a second part of the second portion 220 to the distal end 224. As a result, in some embodiments, the second portion 220 may have a shape of an hourglass. In these and other embodiments, a width and/or length of the second portion 220 may vary. As a result, a width and/or length for the second portion 220 may be determined for a certain area of the second portion 220. For example, in the area near the middle of the second portion 220, the length and width of the second portion 220 may be less than the length and width of the second portion 220 in the area near the proximal end 222 of the second portion 220.

In some embodiments, the second portion 220 tapering to and expanding away from a midsection of the second portion 220 may allow a thumb and an index finger of the user to be in a substantially neutral and relaxed fashion when a hand of a user is gripping the handgrip 200. This neutral and relaxed position may be substantially similar to the human hand at rest as it hangs at the user's side. Stated differently, when the hand hangs at shoulder width and there is very little forearm and hand muscle (grip) contraction, the hand may form a neutral cupping in which the index finger and thumb form a small gap. The second portion 220 may be configured to fit in the gap formed between a relaxed index finger and thumb without stretching the hand from the neutral or relaxed position.

In these and other embodiments, the second side 228 may have a convex shape. As a result, the second side 228 may approximately follow an arc of a circle. In these and other embodiments, the second side 228 may have shape that approximately follows the arc of the circle that has a radius of approximately 0.4, 0.5, 0.6, 0.75, 1.0, 2.0 inches or some other radius. Alternately or additionally, the second side 228 may have a shape that approximately follows the arc of the circle that has a radius that ranges between 0.15 inches and 1 inch, between 0.25 inches and 0.75 inches, or that has another range of values. In some embodiments, the second side 228 may be configured to be positioned in contact with a space between a thumb and an index finger, e.g., a thenar space, of a hand that is gripping the handgrip 200. As a result, the sizing of the second side 228, such as the radius of a circle for which the shape of the second side 228 approximately follows the arc, may correspond to an average space between a thumb and an index finger.

The first side 226 and a side opposite the first side 226 may have a convex shape, a concave shape, or be straight or substantially straight. In these and other embodiments, the first side 226 and the side opposite the first side 226 may be different or the same. A side opposite the second side 228 may be similar to the second side 228 or different from the second side 228.

The third portion 240 may be rigidly coupled to the second portion 220 such that the third portion 240 is fixed with respect to the second portion 220. In particular, the third portion 240 may be rigidly coupled to the distal end 224 of the second portion 220. The third portion 240 as illustrated may expand for a first part of the third portion 240 as the third portion 240 extends away from the second portion 220 in a direction substantially perpendicular to the center axis 204. A second part of the third portion 240 may taper as the third portion 240 continues to extend away from the second portion 220 in a direction substantially perpendicular to the center axis 204.

The third portion 240 may include a length between edges 242 and 244 and a width between edges 244 and 246. The length and the width of the third portion 240 may vary based on the expanding and tapering of the third portion 240. Thus, the length and the width of the third portion 240 may be determined for an area of the third portion 240. For example, in an area near the middle of the third portion 240, the length and width of the third portion 240 may be maximized.

In some embodiments, the length and width of the third portion 240 may be longer than the length and width of the second portion 220. In these and other embodiments, the smallest length and width of the third portion 240 may be longer than the longest length and width of the second portion 220. Alternately or additionally, the smallest length and width of the third portion 240 may be longer than the smallest length and width of the second portion 220 but shorter than the longest length and width of the second portion 220.

As illustrated, the third portion 240 may be offset from the center of the distal end 224 of the second portion 220. As a result, a first side 250 of the third portion 240 may extend further away from the distal end 224 than a second side 252 of the third portion 240. The first side 250 may be positioned over the second side 228. As a result, when a portion of a hand is placed in contact with the second side 228, the first side 250 may act to maintain the hand in a position in contact with the second side 228. For example, the first side 250 may provide a force away from the third portion 240 toward the first portion 210 on a top surface of the hand in contact with the second side 228. As a result, the handgrip 200 may reduce a gripping effort of a user of the handgrip 200.

The fourth portion 270 may be coupled to and fixed with respect to the first portion 210 and the proximal end 222 of the second portion 220. The fourth portion 270 may include an area 272 that extends away from the proximal and the distal ends 222 and 224 of the second portion 220. In particular, the area 272 may substantially follow a surface contour of the opening 212 near the proximal end 222 of the second portion 220. As the area 272 extends away from the proximal end 222 and the surface contour of the opening 212 becomes more steep, the area 272 may deviate from the surface contour of the opening 212 and more shallowly descend away from the proximal and the distal ends 222 and 224 of the second portion 220 than when the area 272 followed the surface contour of the opening 212. The area 272 may be configured such that a portion of a hand, when gripping the handgrip 200, may rest on the area 272. For example, a portion of a palm of a hand may rest on the area 272. The area 272 may also include a top surface that may be configured to be further from the center axis of the opening of the first portion than an outer surface of a handle when the handle is received in the opening 212.

In some embodiments, as illustrated, the handgrip 200 may include beveled or rounded edges and surfaces to reduce pressure points on a hand gripping the handgrip 200. Alternately or additionally, one or more of the portions of the handgrip 200 may be made of rubber, silicon, or some other cushioning material, for vibration dampening and/or comfort of a user of the handgrip 200. In some embodiments, the handgrip 200 may include through-holes 260 and 262. The through-holes 260 and 262 may reduce a weight of the handgrip 200, provide ornamental looks for the handgrip 200, or serve any other function.

Modifications, additions, or omissions may be made to the handgrip 200 without departing from the scope of the present disclosure. For example, in some embodiments, the second portion 220 may taper from the proximal end 222 to the distal end 224. Alternately or additionally, the second portion 220 may not taper or may taper from the distal end 224 to the proximal end 222. Alternately or additionally, the handgrip 200 may include a fifth portion that extends laterally outward from the second portion 220 in the direction of the center axis 204 so that a thumb may rest to the side of the second portion 220. Alternately or additionally, the handgrip 200 may not include the fourth portion 270 and/or the third portion 240. In some embodiments, the handgrip 200 may be used by both a left hand and a right hand of a user.

Figure 3:
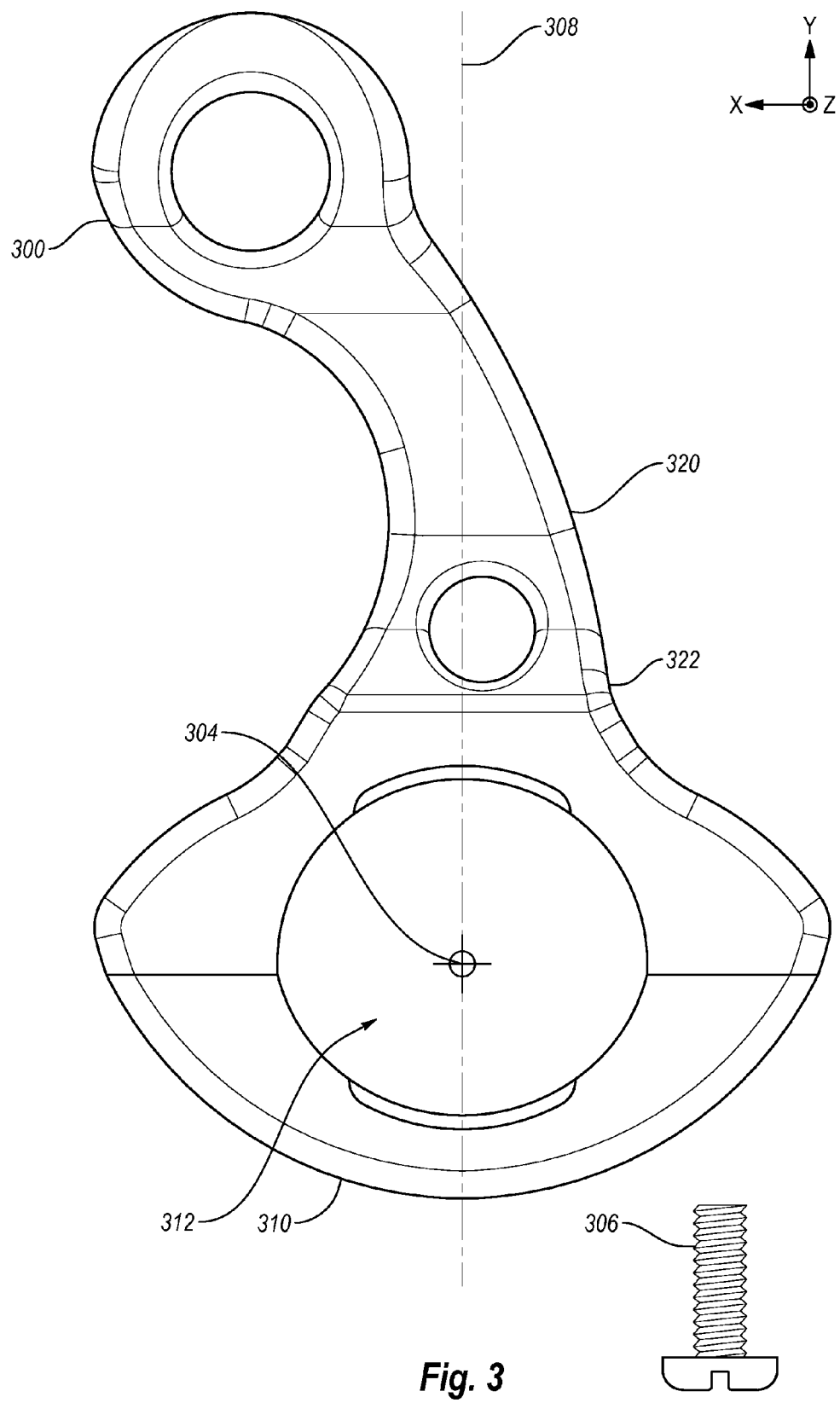
FIG. 3 is a side view of another example handgrip.

FIG. 3 is a side view of another example handgrip 300, arranged in accordance with at least one other embodiment described herein. The handgrip 300 may be configured to be removably coupled to a handle. The handgrip 300 may be analogous to the handgrip 200 and may include a first portion 310 and a second portion 320. The first portion 310 may differ from the first portion 210 of FIG. 2. The first portion 310 may include an opening 312 with a center axis 304. The first portion 310 may also include an opening such that the first portion 310 may act as a handle clamp. In these and other embodiments, a single fastener 306 may be used to provide a clamping force to secure the handgrip 300 to a handle. The fastener 306 may be a machine screw, or in other embodiments, any type of suitable fastening device such as screws, bolts, or some other type of fastening device.

Further illustrated in FIG. 3 is middle axis 308 of the handgrip 300 that extends through a middle of a proximal end 322 of the second portion 320 and intersects with the center axis 304 extending through the opening 312. FIG. 3 also illustrates a coordinate system for reference in discussing FIG. 3. The coordinate system is a Cartesian coordinate system with an x-axis extending between left and right sides of FIG. 3, a y-axis extending between top and bottom sides of FIG. 3, and a z-axis extending into and out of FIG. 3. Other coordinate systems may be used.

The handgrip 300 as illustrated in FIG. 3, includes a center of the proximal end 322 of the second portion 320 aligned with the middle axis 308. In some embodiments, the handgrip 300 may be configured such that the center of the proximal end 322 is not aligned with the second portion 320. In these and other embodiments, the center of the proximal end 322 may be shifted in the x-axis in either direction. For example, the center of the proximal end 322 may be shifted in the x-axis such that the center of the proximal end 322 is offset from the middle axis 308 by twice the diameter of the opening 312. Alternately or additionally, the center of the proximal end 322 may be shifted in the x-axis such that the center of the proximal end 322 is offset from the middle axis 308 by the diameter of the opening 312, by half the diameter of the opening 312, or by less than half of the diameter of the opening 312. In these and other embodiments, the first portion 310 may be configured to couple to the second portion 320 as it is offset from the middle axis 308.

In some embodiments, the handgrip 300 may be rotated about the center axis 304 in the xy plane. For example, in some embodiments, the handgrip 300 may be rotated up to 90 degrees in either direction from the middle axis 308. Alternately or additionally, the handgrip 300 may be rotated up to 45 degrees in either direction from the middle axis 308.

In some embodiments, the handgrip 300 may be rotated about the middle axis 308 in the zy plane. In these and other embodiments, the handgrip 300 may be rotated up to 45 degrees in either direction in the zy plane. In these and other embodiments, the opening 312 may be configured such that the handgrip 300 may be rotated in the zy plane. Modifications, additions, or omissions may be made to the handgrip 300 without departing from the scope of the present disclosure.

Figure 4A:
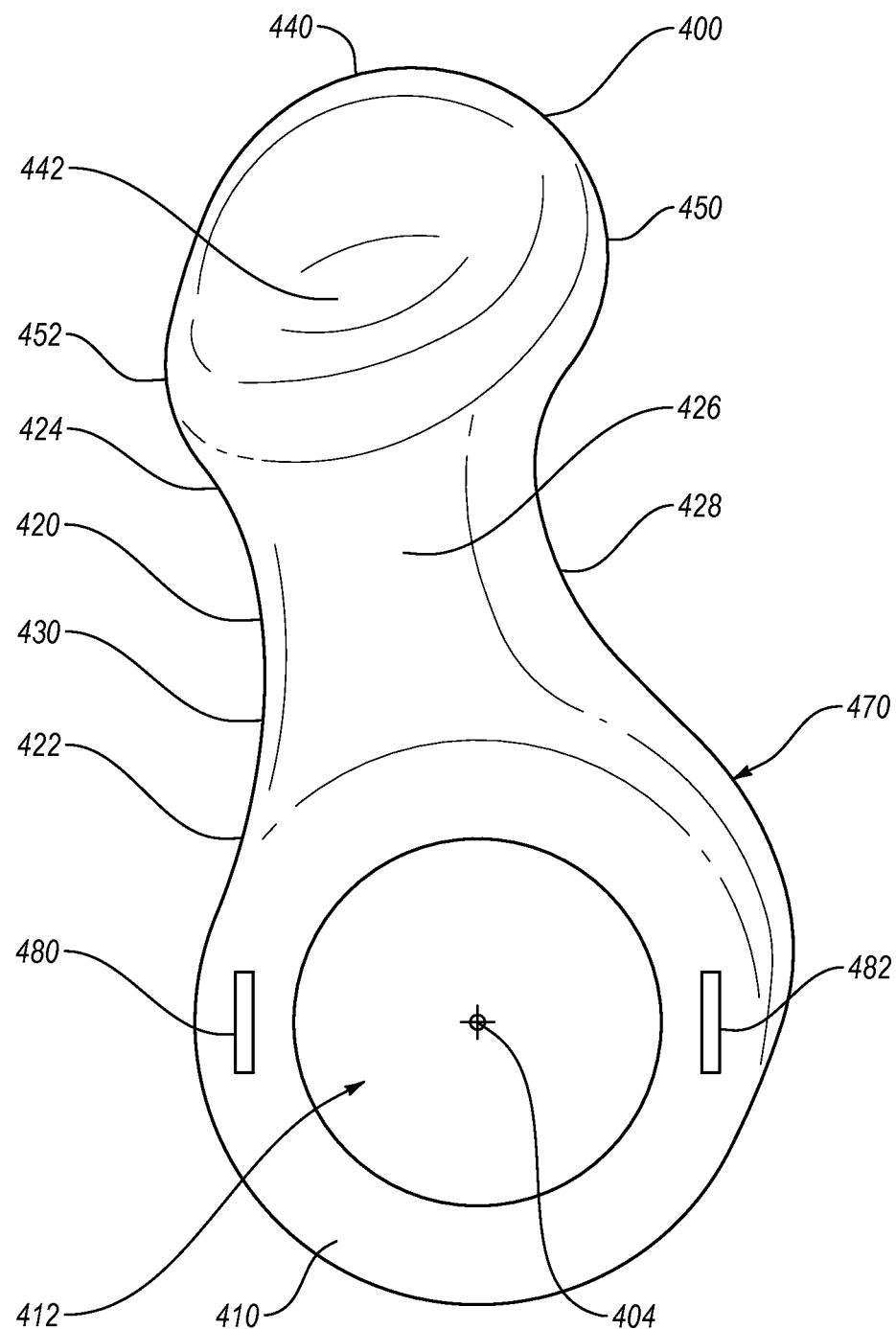
FIG. 4A is a side view of another example handgrip.

FIGS. 4A and 4B illustrate two side views of another example handgrip 400, arranged in accordance with at least one embodiment described herein. The handgrip 400 may include a first portion 410, a second portion 420, a third portion 440, and a fourth portion 470. The handgrip 400 may be formed of a rigid material such as a composite (e.g., carbon fiber), a metal (e.g., aluminum, steel, titanium, alloy, etc.), a polymer, some combination thereof, or some other material or combination of materials. The handgrip 400 may be machined from a solid block of the rigid material, molded (e.g., injection molded, cast, etc.) from a rigid material, or otherwise constructed.

The first portion 410 may include an opening 412 that may be sized to receive a handle 402 as illustrated in FIG. 4B. The opening 412 may include a center axis 404 that passes therethrough. The opening 412 is depicted as a circular opening, but the opening 412 may be different shapes, for example, square, oval, rectangular, hexagonal, octagonal, or some other shape. In some embodiments, the shape of the opening 412 may correspond to the shape of the handle to which the handgrip 400 may be removably attached.

The first portion 410 may further include indentations/tabs 480, 482, and 484 The indentations/tabs 480, 482, and 484 may be configured to mate with a lock-on ring 408, a handle cover 406, or some other device that is coupled to the handle 402. As a result, the first portion 410 may mate with the lock-on ring 408 and/or the handle cover 406 to secure the first portion 410 and thus the handgrip 400 to the handle. In some embodiments, the first portion 410 may include indentations/tabs 480, 482, and 484 or some other device that may mate with the lock-on ring 408 or the handle cover 406 to secure the handgrip 400 to the handle. In some embodiments, one or more of the lock-on rings 408, the handle cover 406, and/or other devices may be part of the first portion 410. In these and other embodiments, the handgrip 400 may be coupled to the handle by the integrated lock-on rings 408, the handle cover 406, and/or other devices. In some embodiments, the lock-on rings 408, the handle cover 406, and/or other devices may be shaped to provide support and/or comfort for a portion of a hand that is gripping the handgrip 400.

The second portion 420 may be rigidly coupled to the first portion 410 such that the second portion 420 is fixed with respect to the first portion 410. The second portion 420 may include a proximal end 422 and a distal end 424. The proximal end 422 may be coupled to the first portion 410. The distal end 424 may be coupled to the third portion 440. The distal end 424 may extend away from the proximal end 422 such that the distal end 424 is positioned further from the center axis 404 of the opening 412 of the first portion 410 than the proximal end 422. In some embodiments, the proximal end 422 may be positioned directly over the opening 412 of the first portion 410.

As illustrated in FIG. 4B, the second portion 420 may curve away from the first portion 410 in a direction of the center axis 404, such that a part of the second portion 420 may extend over a part of a handle 402 that is not covered by the first portion 410. The second portion 420 as it approaches the distal end 424 may curve back in toward the first portion 410 such that at least a portion of the third portion 440 is over the first portion 410.

The second portion 420 may further include a first side 426, a second side 428, a third side 430, and a fourth side 432 that each extends between the proximal end 422 and the distal end 424. The first side 426 may be facing a first direction that is substantially parallel to the center axis 404. In some embodiments, the first direction being substantially parallel to the center axis 404 may indicate that the first direction is within 0, 5, 10, or 20 degrees of being parallel with the center axis 404. The fourth side 432 may be opposite the first side 426.

The second side 428 may be facing a second direction that is substantially perpendicular to the first direction. In some embodiments, substantially perpendicular may indicate that the second direction is within 0, 5, 10, or 20 degrees of being perpendicular with the first direction. The third side 430 may be opposite the second side 428.

The second portion 420 may have a length along the first side 426 and a width along the second side 428. As illustrated, the length of the second portion 420 may be larger than the width of the second portion 420. In some embodiments, the length of the second portion 420 may be twice or more than twice the width of the second portion 420. The second portion 420 having the length longer than the width may provide for better user control of a handle coupled to the handgrip 400 and comfort for a user.

As illustrated, the second portion 420 may taper as the second portion 420 extends from the proximal end 422 for a first part of the second portion 420. After tapering, the second portion 420 may then expand for a second part of the second portion 420 to the distal end 424. As a result, the second portion 420 may be configured to fit in the gap formed between a relaxed index finger and thumb without stretching a hand from the neutral or relaxed position.

In these and other embodiments, the second side 428 may have a concave shape. As a result, the second side 428 may approximately follow an arc of a circle. In these and other embodiments, the second side 428 may have a shape that approximately follows the arc of the circle that has a radius of approximately 0.4, 0.5, 0.6, 0.75, 1.0, 2.0 inches or some other radius. Alternately or additionally, the second side 428 may have the shape that approximately follows the arc of the circle that has a radius that ranges between 0.15 inches and 1 inch, between 0.25 inches and 0.75 inches, or that has another range of values. In some embodiments, the second side 428 may be configured to be positioned in contact with a space between a thumb and the index finger, e.g., a thenar space, of a hand that is gripping the handgrip 400. The third side 430 may have a convex shape, a concave shape, or be straight or substantially straight.

The first side 426 may also have a concave shape. As a result, the first side 426 may approximately follow an arc of a circle. In these and other embodiments, the first side 426 may have a shape that approximately follows the arc of the circle that has a radius of approximately 0.4, 0.5, 0.6, 0.75, 1.0, 2.0 inches or some other radius. Alternately or additionally, the first side 426 may have the shape that approximately follows the arc of the circle that has a radius that ranges between 0.15 inches and 1 inch, between 0.25 inches and 0.75 inches, or that has another range of values. In some embodiments, the arc of the circle that approximately follows the first side 426 may be similar to the arc of the circle that approximately follows the second side 428. The fourth side 432 may be convex and may follow the concave shape of the first side 426 or have a different concave shape.

The third portion 440 may be rigidly coupled to the second portion 420 such that the third portion 440 is fixed with respect to the second portion 420. In particular, the third portion 440 may be rigidly coupled to the distal end 424 of the second portion 420. The third portion 440 may include a length as illustrated in FIG. 4A and a width as illustrated in FIG. 4B.

In some embodiments, the length and width of the third portion 440 may be longer than the length and width of the second portion 420. In these and other embodiments, the smallest length and width of the third portion 440 may be longer than the longest length and width of the second portion 420. Alternately or additionally, the smallest length and width of the third portion 440 may be longer than the smallest length and width of the second portion 420 but shorter than the longest length and width of the second portion 420.

As illustrated, the third portion 440 may be offset from the center of the distal end 424 of the second portion 420. As a result, a first side 450 of the third portion 440 may extend further away from the distal end 424 than a second side 452 of the third portion 440. The first side 450 may be positioned over the second side 428. As a result, when a portion of a hand is placed in contact with the second side 428, the first side 450 may act to maintain the hand in a position in contact with the second side 428.

The third portion 440 may further include a top surface 442 that faces away from the center axis 404. The top surface 442 may have a concave shape that extends along at least a part of the width of the third portion 440. The concave shape may be designed to follow approximately the shape of a thumb of a user. In these and other embodiments, an index finger of a hand gripping the handgrip 400 may be placed on the fourth side of the second portion 420 and/or the third portion 440 and a thumb of the hand may be placed on the top surface 442.

In these and other embodiments, the handgrip 400 may be shaped based on which hand of a user is gripping the handgrip 400. For example, the handgrip 400 may be configured to be gripped by a right hand of a user that is positioned facing the second side 428 of the handgrip 400. When the right hand of the user is gripping the handgrip 400, the fingers of the hand may extend over and/or around the handle cover 406 and the thumb of the hand may extend over the first portion 410 and/or lock-on ring 408 The handgrip 400 may also be configured to be gripped by a left hand of a user that is positioned facing the second side 428. In these and other embodiments, the handgrip 400 may have an analogous shape as illustrated in FIG. 4B, but be shaped to receive the left hand in a similar manner that the handgrip illustrated in FIG. 4B is configured to receive a right hand.

The fourth portion 470 may be coupled to and fixed with respect to the first portion 410 and the proximal end 422 of the second portion 420. The fourth portion 470 may extend away from the proximal and the distal ends 422 and 424 of the second portion 420 and the first portion 410. In particular, the fourth portion 470 may substantially follow a surface contour of the opening 412 to extend away from the second portion 420 and extend along the center axis 404 away from the first portion 410. As a result, a part of the fourth portion 470 may extend over a part of the handle 402 that is not covered by the first portion 410. For example, the fourth portion 470 may extend over a portion of the handle cover 406. The fourth portion 470 may be configured such that a portion of a hand, when gripping the handgrip 400, may rest on the fourth portion 470.

Modifications, additions, or omissions may be made to the handgrip 400 without departing from the scope of the present disclosure. For example, the handgrip 400 may not include the fourth portion 470 and/or the third portion 440.

Figure 5:
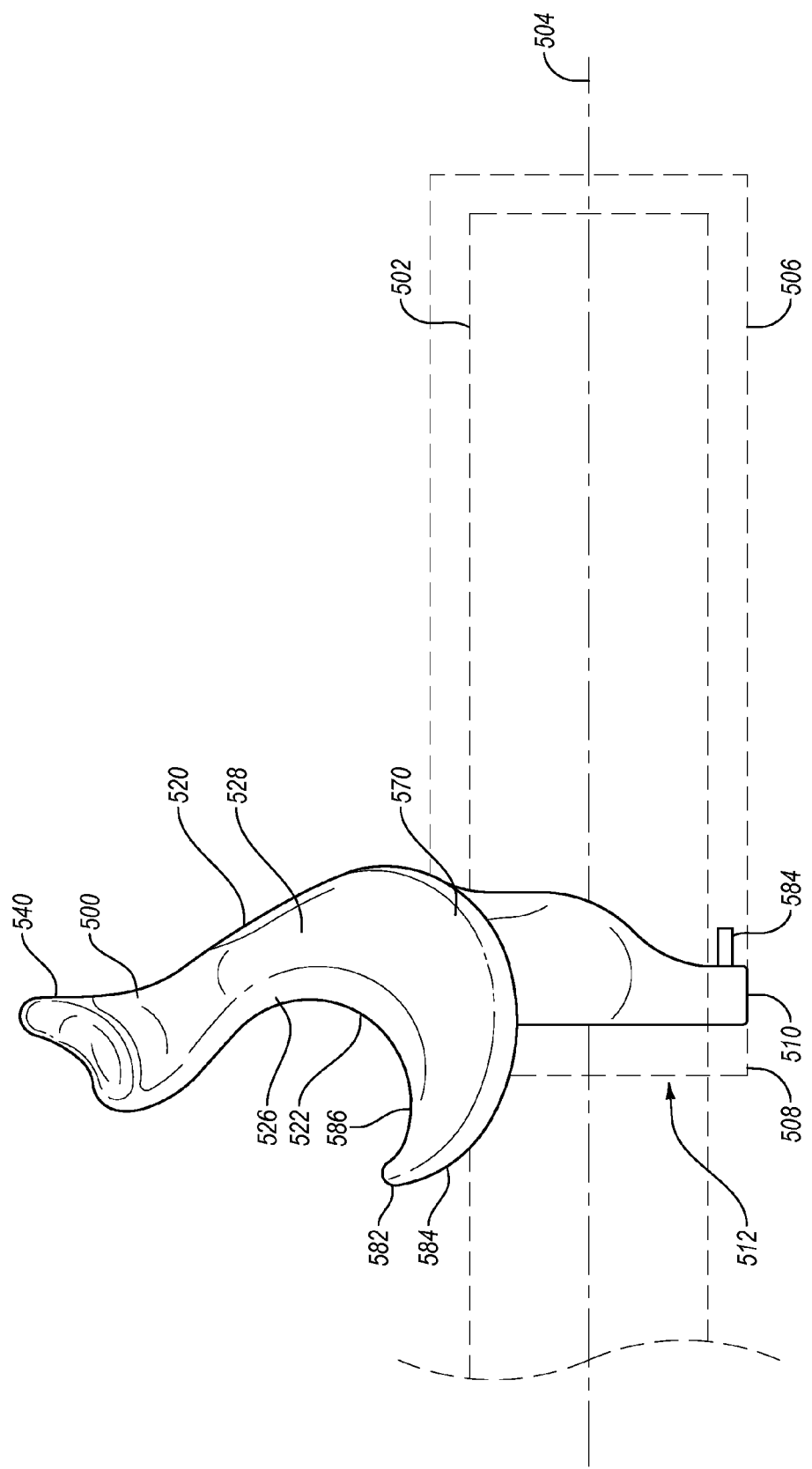
FIG. 5 is a side view of another example handgrip

FIG. 5 is a side view of another example handgrip 500, arranged in accordance with at least one embodiment described herein. The handgrip 500 may include a first portion 510, a second portion 520, a third portion 540, and a fourth portion 570. The handgrip 500 may be formed of a rigid material such as a composite (e.g., carbon fiber), a metal (e.g., aluminum, steel, titanium, alloy, etc.), a polymer, some combination thereof, or some other material or combination of materials. The handgrip 500 may be machined from a solid block of the rigid material, molded (e.g., injection molded, cast, etc.) from a rigid material, or otherwise constructed.

The first portion 510 may include an opening 512 that may be sized to receive a handle 502 as illustrated in FIG. 5. The opening 512 may include a center axis 504 that passes there through. The first portion may further include a tab 584. The tab 584 may be configured to mate with a lock-on ring 508, a handle cover 506, or some other device that is coupled to the handle 502. In some embodiments, the first portion 510 may have further aspects that are analogous to the first portions 210 and 410 of FIGS. 2, 4A, and 4B and thus no further description is provided herein with respect to FIG. 5.

The second portion 520 may be rigidly coupled to the first portion 510 such that the second portion 520 is fixed with respect to the first portion 510. The second portion 520 may include a proximal end 522 and a distal end 524. The proximal end 522 may be coupled to the first portion 510. The distal end 524 may be coupled to the third portion 540. The second portion 520 may further include a first side 526 and a second side 528 that each extend between the proximal end 522 and the distal end 524.

The first side 526 may be facing a first direction that is substantially parallel to the center axis 504. The second side 528 may be facing a second direction that is substantially perpendicular to the first direction. In these and other embodiments, the second side 528 may have a concave shape. As a result, the second side 528 may approximately follow an arc of a circle. In these and other embodiments, the second side 528 may have a shape that approximately follows the arc of the circle that has a radius of approximately 0.4, 0.5, 0.6, 0.75, 1.0, 2.0 inches or some other radius. Alternately or additionally, the second side 528 may have the shape that approximately follows the arc of the circle that has a radius that ranges between 0.15 inches and 1 inch, between 0.25 inches and 0.75 inches, or that has another range of values.

The first side 526 may also have a concave shape. As a result, the first side 526 may approximately follow an arc of a circle. In these and other embodiments, the first side 526 may have a shape that approximately follows the arc of the circle that has a radius of approximately 0.4, 0.5, 0.6, 0.75, 1.0, 2.0 inches or some other radius. Alternately or additionally, the first side 526 may have the shape that approximately follows the arc of the circle that has a radius that ranges between 0.15 inches and 1 inch, between 0.25 inches and 0.75 inches, or that has another range of values. Alternately or additionally, the second portion 520 may have further aspects that are analogous to the second portions 220 and 420 of FIGS. 2, 4A, and 4B and thus no further description is provided herein with respect to FIG. 5.

The third portion 540 may be analogous to the third portions 230 and 430 of FIGS. 2, 4A, and 4B and thus no further description is provided herein with respect to FIG. 5.

The fourth portion 570 may be coupled to and fixed with respect to the first portion 510 and the proximal end 522 of the second portion 520. The fourth portion 570 may extend away from the proximal and the distal ends 522 and 524 of the second portion 520 and the first portion 510.

The fourth portion 570 may include a first surface 586, a second surface 584, and a first end 582. The first surface 586 may extend between the proximal end 522 of the second portion 520 and the first end 582. The first end 582 may be positioned away from the first side 526 along the center axis 504.

In some embodiments, the first surface 586 may extend between the first side 526 of the second portion 520 and the first end 582. In these and other embodiments, the first surface 586 may have a concave shape that couples into the first side 526 such that the first surface 586 approximately follows the arc of the same circle as the first side 526. In these and other embodiments, a portion of the first surface 586 closest to the center axis 504 may be positioned such that a shortest distance between the center axis 504 and the portion of the first surface 586 closest to the center axis 504 is approximately equal to a shortest distance between the center axis 504 and an outer surface of the handle cover 506. Alternately or additionally, the portion of the first surface 586 closest to the center axis 504 is approximately equal to a shortest distance between the center axis 504 and an outer surface of the handle cover 506 minus a thickness of the handgrip 500 at the shortest distance.

In some embodiments, the first surface 586 may also extend along a portion of the length of the first side 526. In these and other embodiments, the first surface 586 may extend along at least half of, at least three-fourths of, or substantially all of the length of the first side 526. In some embodiments, the first surface 586 may be configured to support a thumb of a hand gripping the handgrip 500.

The second surface 584 may also extend between the proximal end 522 of the second portion 520 and the first end 582. In particular, the second surface 584 may extend between the first end 582 and an intersection between the second side 528 and a side opposite the first side 526. The second surface 584 may have a convex shape. In these and other embodiments, the second surface 584 may have a convex shape that approximately follows the arc of the circle that has a radius of approximately 0.75, 1.0, 2.0 inches or some other radius. Alternately or additionally, the second surface 584 may have the shape that approximately follows the arc of the circle that has a radius that ranges between 0.5 inches and 3 inch, between 0.75 inches and 2 inches, or that has another range of values.

The second surface 584 may further extend away from the first and second portions 510 and 520 in a direction substantially perpendicular to the direction along the center axis 504. As a result, the second surface 584 may be elevated with respect to an outer surface of the handle cover 506, such that a lip is formed between the second surface 584 and the handle cover 506.

The fourth portion 570 may further include a side that faces the same direction as the second side 528 between the first surface 586 and the second surface 584. The side may include a concave shape along a direction that is substantially parallel to the center axis 504 and a concave shape along a direction that is substantially perpendicular to the center axis 504. As a result, the side may include a bowl or saddle like shape between the first surface 586 and the second surface 584. The saddle like shape may be configured to have a palm of a hand rest thereon when the hand is gripping the handgrip 500.

Alternately or additionally, an underside of the fourth portion 570 opposite the first end 582 and closest to the center axis 504 may further be configured to allow another device to couple to or contact the lock-on ring 508 or the first portion 510 when the lock-on ring 508 is not used. For example, when the handle 502 is a handlebar of a bicycle, the underside may have a concave shape that follows an arc similar to an arc of the outer surface of the handle 502 that is separated from the outer surface of the handle 502 such that a device, such as a brake or a shifter may couple to the handle 502 between the fourth portion 570 and the handle 502.

Alternately or additionally, a portion of the fourth portion 570 may extend over a part of the handle 502 that is not covered by the first portion 510. For example, the fourth portion 570 may extend over a part of the handle cover 506. As a result, the handgrip 500 may be positioned closer to an end of the handle 504. In these and other embodiments, such as when the handle 504 is a handlebar of a bicycle, positioning the handgrip 500 closer to the end of the handlebar may reduce an area along the handlebar that the handgrip 500 extends away from the end of the handlebar that is not already covered by the handle cover 506. This location of the handgrip 500 may allow additional devices, such as an odometer, brake, and/or shifter to be coupled to the handlebar closer to the handle cover 506 and thus a hand of a cyclist using the handlebar.

The fourth portion 570 may be configured such that a portion of a hand, when gripping the handgrip 500, may rest on the fourth portion 570. For example, a portion of a palm of a hand and a thumb of the hand may rest on the fourth portion 570 when the hand is grasping the handgrip 500.

In these and other embodiments, the handgrip 500 may be shaped based on which hand of a user is gripping the handgrip 500. For example, the handgrip 500 may be configured to be gripped by a right hand of a user that is positioned facing the second side 528 of the handgrip 500. When the right hand of the user is gripping the handgrip 500, the fingers of the hand may extend over and/or around the handle cover 506 and the thumb of the hand may extend over the first portion 510 and/or lock-on ring 508 The handgrip 500 may also be configured to be gripped by a left hand of a user that is positioned facing the second side 528. In these and other embodiments, the handgrip 500 may have an analogous shape as illustrated in FIG. 5, but be shaped to receive the left hand in a similar manner that the handgrip illustrated in FIG. 5 is configured to receive a right hand.

Modifications, additions, or omissions may be made to the handgrip 500 without departing from the scope of the present disclosure. For example, the handgrip 500 may not include the third portion 530 and/or the fourth portion 570.

Figure 6:
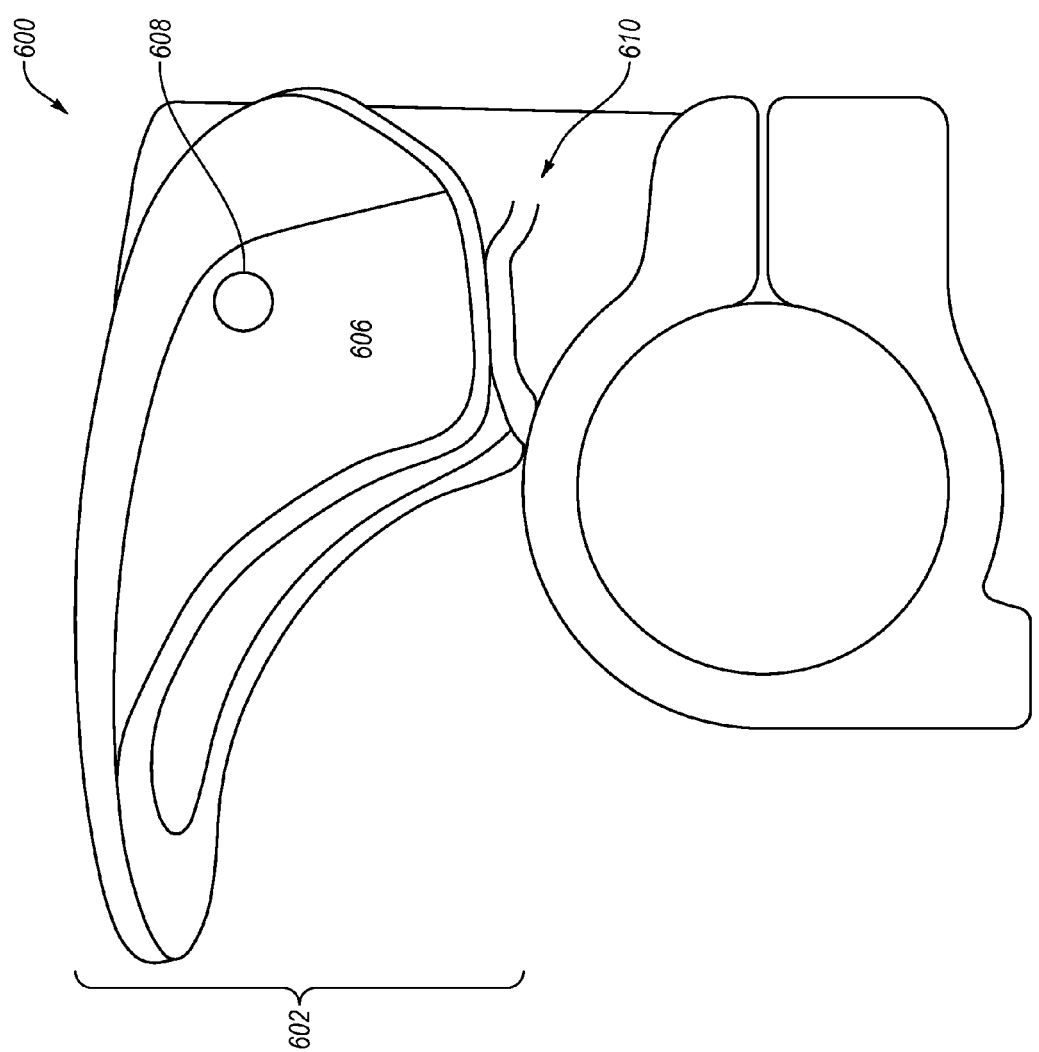
FIG. 6 is a side view of another example handgrip.

FIG. 6 is a side view of another example handgrip 600, arranged in accordance with at least one embodiment described herein. In some embodiments, the handgrip 600 may be configured with a releasable third portion 602. In the depicted embodiment, the third portion 602, as with embodiments described above, extends outward. For example, the third portion 602 may extend outward in an analogous manner as the third portions 240 or 440 of corresponding FIGS. 2, 4A, and 4B. The third portion 602 may engage an upper surface of a hand of a user that is gripping the handgrip 600. The third portion 602 may be biased to "maintain" the user's hand in the gripping position. As the retaining third portion 602 is biased, when the user applies a force sufficient to overcome the bias of the third portion 602, the third portion 502 may release such that the hand may easily release the handgrip 600.

In the depicted embodiment, a cam-lock device may provide the above-described biasing force. The cam-lock may be formed with a lobe area 606 that pivots about an axis 608. The biasing force may be equivalent to the force required to pivot the lobe area 606, via a force applied to the third portion 602, past a lever area 610. In an alternative embodiment, the biasing force may be supplied by a spring-mounted third portion 602. For example, a spring may apply a downward force on the third portion 602 to push the retaining knob towards the tube clamp. A user may easily release his or her hand from gripping the handgrip 600 by overcoming the biasing force of the spring. Modifications, additions, or omissions may be made to the handgrip 600 without departing from the scope of the present disclosure.

Figure 7:
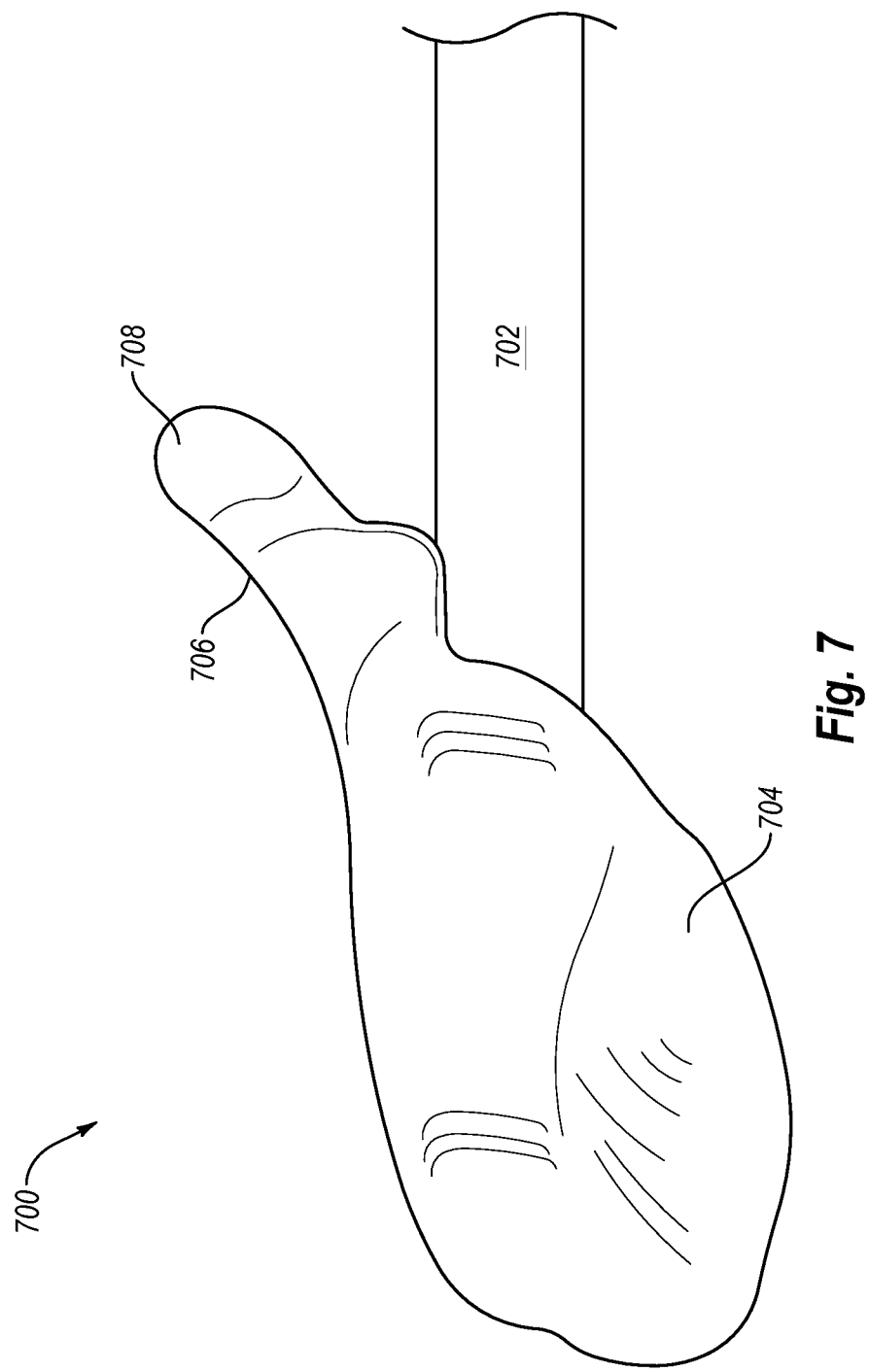
FIG. 7 is a perspective view of another example handgrip.

FIG. 7 is a perspective view of another example handgrip 700, arranged in accordance with at least one embodiment described. The handgrip 700 may be formed as a unitary handgrip having first and second portions 706 and 708 and a palm shelf 704, as depicted. The first and second portions 706 and 708 may be analogous to the second and third portions illustrated in FIGS. 1, 2, 3, 4A, and 4B. The first portion illustrated in FIGS. 1, 2, 3, 4A, and 4B may be integrated into the palm shelf 704.

In some embodiments, the palm shelf 704 may extend outward from a handle 702 a distance of in the range of between about 0.25 and 4 inches, or any other distance deemed ergonomically satisfying to a user. Modifications, additions, or omissions may be made to the handgrip 700 without departing from the scope of the present disclosure.

Figure 8:
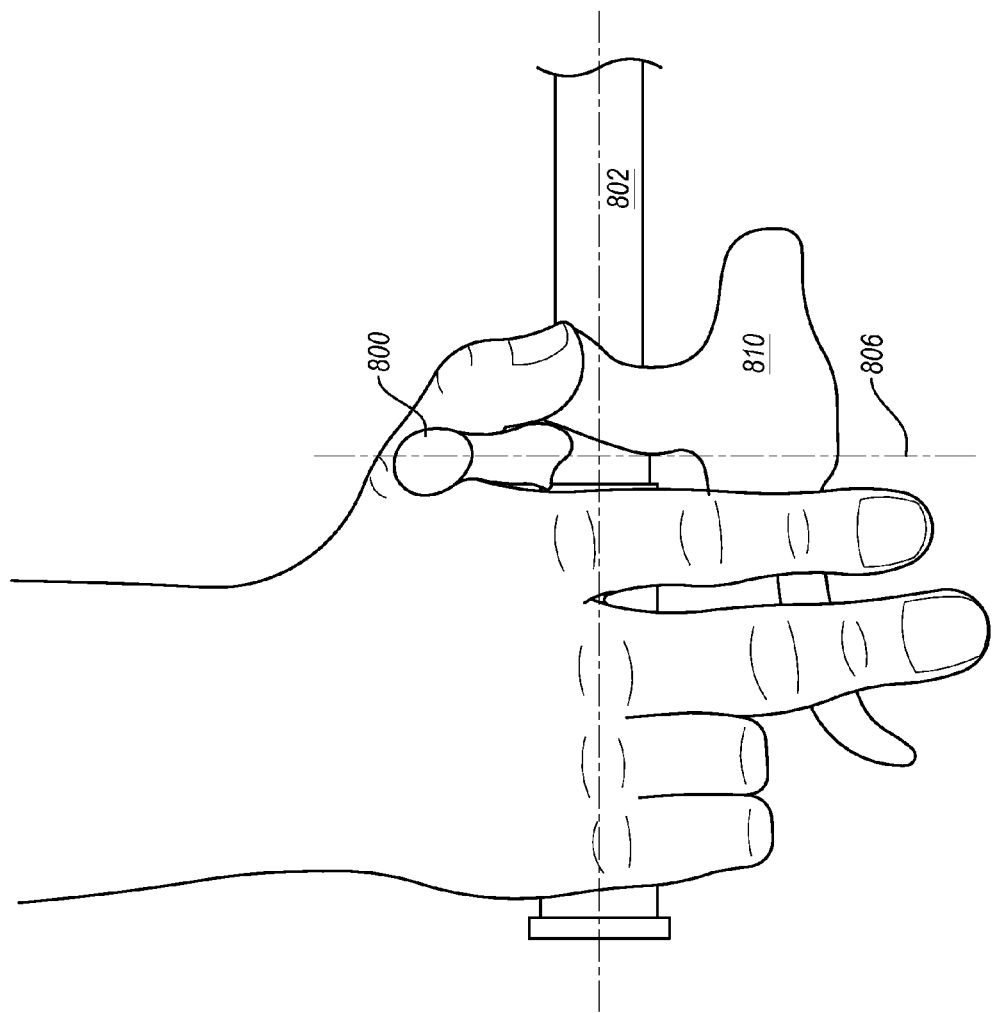
FIG. 8 is top view of another example handgrip in use.

FIG. 8 is top view of another example handgrip 800 in use, arranged in accordance with at least one embodiment described herein. The handgrip 800 is illustrated coupled to a handlebar 802 of a bicycle.

The handgrip 800 may be oriented such that the handgrip 800 extends in a perpendicular axis 806 away from a central axis 804 of the handlebar 802. In these and other embodiments, the handgrip 800 may extend away from the central axis 804 in a direction that is substantially normal to the ground when the bicycle is being ridden on flat ground.

As illustrated, the handgrip 800 is located between a stem of a bicycle that supports the handlebar 802 and an end of the handlebar 802 with sufficient space between the end of the handlebar 802 and the handgrip 800 such that a user of the bicycle (referred to herein as "the cyclist") may grasp the handlebar 802 between the end of the handlebar 802 and the handgrip 800. Unlike traditional bar ends that cause the cyclist to position his or her hands at an angle with reference to the central axis 804, the position of the handgrip 800 may allow the hands of the cyclist to grip the handlebar 802 in a direction parallel to the central axis 804 of the handlebar 802. In other words, when the hands of the cyclist is gripping the handgrip 800, the fingers of the cyclist may also wrap around the central axis 804 of the handlebar 802.

As illustrated, the handgrip 800 assists the cyclist to grip the handlebar 802 in a thumb-over-the-bar position. The handgrip 800, while assisting the cyclist to grip the handlebar 802 in the thumb-over-the-bar position, may not detract from the ability of the cyclist to continually access a brake lever 810 without the cyclist having to move his or her hand. The handgrip 800, while assisting the cyclist to grip the handlebar 802 in the thumb-over-the-bar position, may also not detract from the ability of the cyclist to shift gears of the bicycle without adjusting their hand position. In some embodiments, the handgrip 800 may reduce injuries to hands of the cyclist by minimizing compression, nerve, and fracture injuries to fingers, hands, and wrists.

Modifications, additions, or omissions may be made to the handgrip 800 without departing from the scope of the present disclosure. For example, in some embodiments, the handgrip 800 may be formed as part of other handlebar accessories/devices, such as, but not limited to, shifter body/mount, brake body/mount, computer mount, etc. Other accessories may be made to fit this form factor as well. Examples include, but are not limited to, phone mounts, light mounts, etc.

In some embodiment, the handgrip 800 may be coupled with the handlebar via a hinged device that allows the handgrip 800 to pivot or rotate along the central axis 804. In some embodiments, the handgrip 800 may be formed as part of the handlebar 802. For example, the handgrip 800 may be welded or integrally formed with the handlebar 802.

Figure 9:
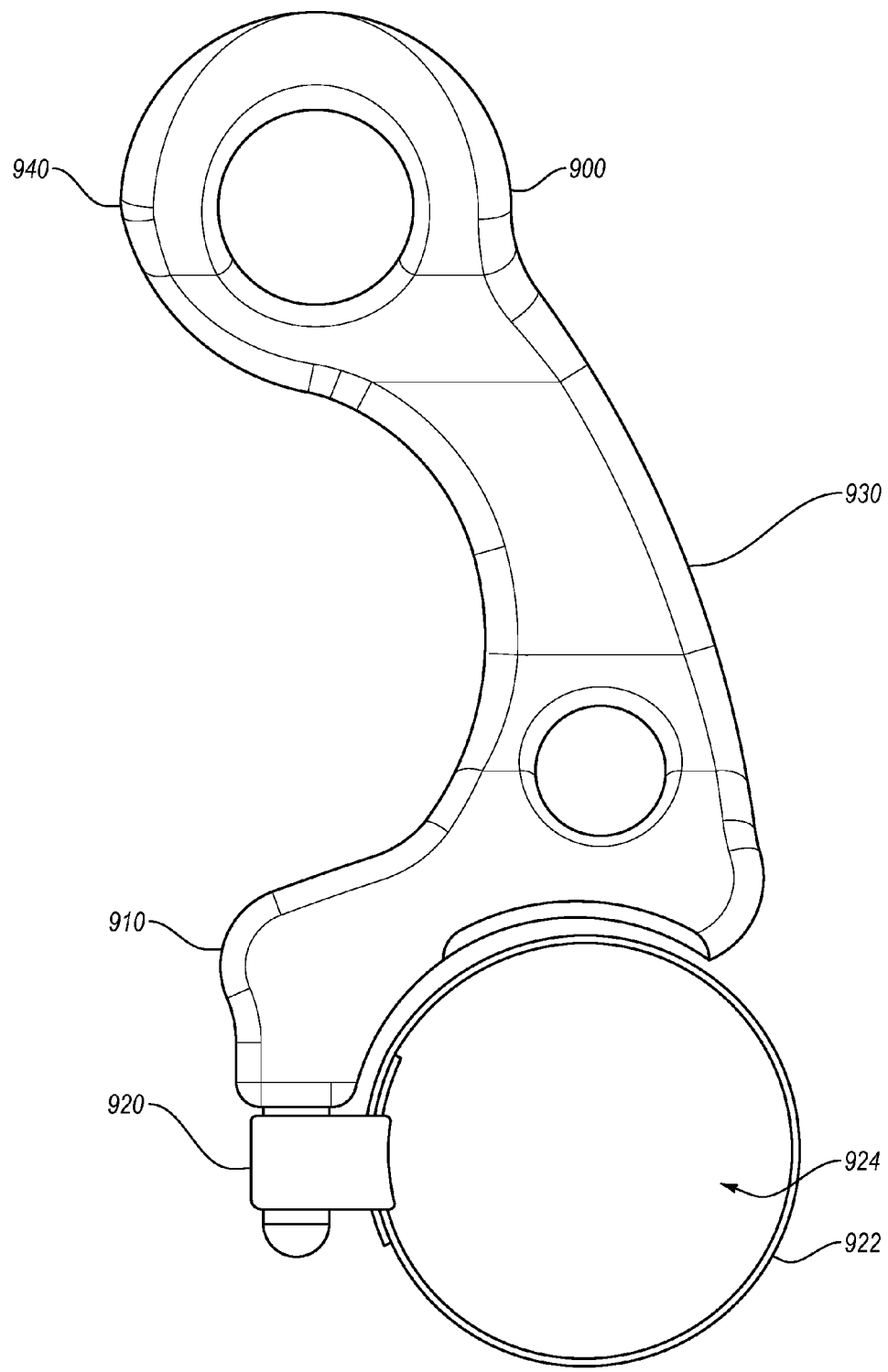
FIG. 9 is a side view of another example handgrip.

FIG. 9 is a side view of another example handgrip 900, arranged in accordance with at least one embodiment described herein. The handgrip 900 may include a first portion 910, a second portion 930, and a third portion 940. The second and third portions 930 and 940 may be analogous to the second and third portions described with respect to FIGS. 1, 2, 3, 4A, 4B, and 5.

The first portion 910 may be rigidly coupled to the second portion 930. As illustrated, the first portion 910 may be coupled to a clamp adjuster 920. The clamp adjuster 920 may be coupled to a clamp 922 and be configured to adjust a diameter of the clamp 922. In particular, the clamp adjuster 920 may be configured to adjust the diameter of the clamp 922 when an internal screw or other rotatable mechanism is rotated. In these and other embodiments, the first portion 910 may be coupled to the twistable mechanism of the clamp adjuster 920. As a result, the diameter of the clamp 922 may be adjusted by rotating the handgrip 900. For example, rotating the handgrip 900 in a first direction, such as a clockwise direction, may increase the diameter of the clamp 922. In contrast, rotating the handgrip 900 in a second direction, such as a counterclockwise direction, may decrease the diameter of the clamp 922.

In use, a handle may be positioned in an opening 924 within the clamp 922. The handgrip 900 may be rotated in a first direction to decrease the diameter of the clamp 922 until the clamp 922 is securely coupled to the handle. The handgrip 900 may then be used when grasping the handle. After use, the handgrip 900 may be rotated in a second direction to increase the diameter of the clamp 922 until the handle may be removed out of the opening 924. In these and other embodiments, the handgrip 900 and/or the clamp adjuster 920 may include a stop mechanism, such as an arm, that may reduce the rotation of the handgrip 900 with respect to the clamp 922. In these and other embodiments, the arm may be used to reduce or stop the rotation of the handgrip 900 when the handgrip 900 is being used to grip the handle coupled to the clamp 922 such that the adjustment of the diameter of the clamp 922 is reduced or eliminated when the handgrip 900 is being used to grasp the handle.

By having the rotation of the handgrip 900 adjust the diameter of the clamp 922, the handgrip 900 may more easily be coupled and uncoupled with a handle using the clamp 922 than if a tool is used to adjust the clamp 922. Modifications, additions, or omissions may be made to the handgrip 900 without departing from the scope of the present disclosure.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A handgrip device that is configured to be removably coupled to a handle, the handgrip device comprising:
   a first portion that includes an opening with a center axis, wherein the opening is configured to receive a portion of a handle that includes a center rotational axis such that the center rotational axis is substantially aligned with the center axis of the first portion; and
   a second portion that is coupled to and fixed with respect to the first portion, the second portion comprising:
      a proximal end that includes a first part and a second part, wherein the first part is coupled to the first portion and the second part forms a lip that extends away from the first portion over a part of the handle that is not extended over by the first portion;
      a distal end extended away from the proximal end such that the distal end is positioned further from the center axis of the opening of the first portion than the proximal end, wherein the distal end is offset from the second part of the proximal end of the second portion in a first direction;
      a first concaved side coupled between the proximal and distal ends, the first concaved side facing the first direction and extending from the first part of the proximal end of the second portion;
      a second side coupled between the proximal and distal ends, the second side facing a second direction substantially perpendicular to the first direction; and
      a third side that is opposite the first concaved side and facing a third direction opposite and substantially parallel to the first direction and substantially perpendicular to the second direction, the third side extending from the lip at the proximal end of the second portion.

2. The handgrip device of claim 1, wherein the proximal end further includes a third part, the third part forming a second lip that extends away from the first portion and in a direction opposite from the second part, the third part extending over a second part of the handle that is not extended over by the first portion or the second portion.

3. The handgrip device of claim 2, wherein the first direction is substantially parallel to the center axis of the first portion.

4. The handgrip device of claim 1, wherein the first concaved side is configured to receive a thumb of a user griping the handgrip device.

5. The handgrip device of claim 1, wherein the third side has convex shape.

6. The handgrip device of claim 1, wherein the handle is a handlebar of a bicycle.

7. A handgrip device comprising:
   a first portion that includes an opening with a center axis, wherein the opening is configured to receive a portion of a handle that includes a center rotational axis such that the center rotational axis is substantially aligned with the center axis of the first portion; and
   a second portion that is coupled to and fixed with respect to the first portion, the second portion comprising:
      a proximal end that includes a first part and a second part, wherein the first part is coupled to the first portion and the second part forms a lip that extends away from the first portion over a part of the handle that is not extended over by the first portion;
      a distal end extended away from the proximal end such that the distal end is positioned further from the center axis of the opening of the first portion than the proximal end, wherein the distal end is offset from the second part of the proximal end in a first direction;
      a first side coupled between the proximal and distal ends, the first side facing the first direction and extending from the first part, the first side including a first width that extends perpendicular to a plane that includes the proximal end and the distal end;
      a second side coupled between the proximal and distal ends, the second side facing a second direction substantially perpendicular to the first direction, the second side including a second width that extends perpendicular to the first width and perpendicular to the plane that includes the proximal end and distal end, wherein the first width is at least twice as long as the second width; and
      a third side that is opposite the first side and facing a third direction opposite the first direction and substantially perpendicular to the second direction, the proximal end of the third side beginning at the lip at the proximal end of the second portion.

8. The handgrip device of claim 7, wherein the first side includes a concave shape.

9. The handgrip device of claim 8, wherein the first direction is substantially parallel to the center axis of the first portion.

10. The handgrip device of claim 9, wherein the first side is configured to receive a thumb of a user griping the handgrip device.

11. The handgrip device of claim 7, wherein the second side includes a concave shape.

12. The handgrip device of claim 7, wherein the third side includes a convex shape.

13. The handgrip device of claim 7, wherein the handle is a handlebar of a bicycle.

14. A handle comprising:
a first end;
a second end;
an elongated central portion extending between the first end and the second end, the central portion including a center rotational axis that extends between the first end and the second end; and
a protrusion along the central portion between the first end and the second end, the protrusion extending away from the center rotational axis in a first direction that is substantially perpendicular to the center rotational axis, the protrusion positioned to be offset toward the first end from a middle point on the central portion that is equally distanced between the first end and the second end, the protrusion comprising:
a proximal end adjacent to the central portion that includes a first side and a second side, the second side of the proximal end positioned opposite and away from the first side of the proximal end in a second direction toward the first end;
a distal end extended away from the proximal end such that the distal end is positioned further from the center rotational axis of the central portion than the proximal end, wherein the distal end is offset from the second side of the proximal end in a third direction that is opposite the second direction;
a first concaved side coupled between the proximal end and the distal end, the first concaved side facing the third direction and the second end and extending from the first side of the proximal end;
a second protrusion side coupled between the proximal and distal ends, the second protrusion side facing a fourth direction substantially perpendicular to the second direction and the third direction; and
a third convex side coupled between the proximal end and the distal end, the third convex side being opposite the first side and facing the second direction and the first end, the third convex side extending from the second side of the proximal end.

15. The handle of claim 14, wherein the protrusion is removably attached to the central portion.

16. The handle of claim 14, wherein the protrusion is integral to the central portion.

17. The handle of claim 14, wherein the second direction and the third direction are substantially parallel with the center rotational axis of the central portion.

18. The handle of claim 14, wherein the first direction is substantially perpendicular with the center rotational axis of the central portion when the first direction is within approximately twenty degrees of perpendicular with the center rotational axis of the central portion.

19. The handle of claim 14, wherein the first concaved side includes a first width that extends perpendicular to a plane that includes the proximal end and the distal end, the second protrusion side includes a second width that extends perpendicular to the first width and perpendicular to the plane that includes the proximal end and the distal end, wherein the first width is at least twice as long as the second width.

20. A bicycle comprising the handle of claim 14.

* * * * *